United States Patent [19]

Holmes

[11] 4,276,001

[45] Jun. 30, 1981

[54] FLUID PUMP ASSEMBLY

[75] Inventor: Lambert Holmes, St. Louis, Mo.

[73] Assignee: Dema Engineering Co., St. Louis, Mo.

[21] Appl. No.: 3,413

[22] Filed: Jan. 15, 1979

[51] Int. Cl.³ .............................................. F04B 17/00
[52] U.S. Cl. ........................................ 417/401; 91/50; 91/275; 91/444; 137/99; 417/505
[58] Field of Search .................. 417/401, 505; 137/99; 91/275, 444, 47, 50

[56] References Cited

U.S. PATENT DOCUMENTS

| | | | |
|---|---|---|---|
| 2,060,180 | 11/1936 | Davis | 417/401 |
| 2,900,917 | 8/1959 | Schinnerer | 91/47 X |
| 3,421,448 | 1/1969 | Brewer et al. | 91/275 X |
| 3,547,560 | 12/1970 | Miller | 417/375 |
| 3,621,865 | 11/1971 | Baggaley | 417/401 X |
| 4,098,560 | 7/1978 | O'Neill | 417/401 X |
| 4,193,264 | 3/1980 | Takahashi | 417/401 X |

Primary Examiner—Leonard E. Smith
Attorney, Agent, or Firm—Cohn, Powell & Hind

[57] ABSTRACT

A fluid pump assembly having a body provided with a fluid chamber and a passage having an orifice, the passage connecting the chamber to a conduit carrying a pressurized flow of fluid. Pump apparatus has an inlet connected to a fluid additive supply, and an outlet which communicates with the conduit for feeding the fluid additive to the conduit. Control apparatus includes a dump passage communicating with the chamber and has a cross section larger than the orifice. A dump valve controls the flow of fluid through the dump passage to regulate the fluid pressure in the fluid chamber, and motor apparatus operatively connects the pump apparatus and the dump valve. The motor apparatus is responsive to the fluid pressure in the fluid chamber for operating the dump valve and actuating the pump apparatus to pump fluid additive through the outlet. The motor apparatus includes a flexible motor element subject to fluid pressure in the fluid chamber, permanent magnets attached to and movable with the flexible motor element, and a ferrous plunger operatively attached to the dump valve. The flexible motor element moves the permanent magnets in a first direction to open the dump valve, and in an opposite second direction to allow a spring to close the dump valve. The pump assembly includes a piston rod operatively connected to and extending from one side of the flexible motor element. The rod extends to pump cylinder where the reciprocating motion imparted by the flexible motor element is used to draw additive fluid into the pump inlet and out of the pump outlet to provide the fluid additive to the conduit.

7 Claims, 2 Drawing Figures

FLUID PUMP ASSEMBLY

BACKGROUND OF THE INVENTION

The typical fluid driven pump assembly is operated by the cycling on and off of the pressurized fluid flow in the conduit. Such units will not operate where a continuous pressurized fluid flow is present in the conduit. A complicated two valve or toggle valve arrangement has been used in an attempt to overcome this problem.

SUMMARY OF THE INVENTION

This invention relates generally to a fluid pump assembly that operates by means of fluid pressure, and more particularly relates to an improved mechanism for injecting a fluid additive into a pressurized fluid-carrying conduit.

Although suitable for many other uses, this pump assembly is adapted for the injection of liquid rinse additive into the rinse water of a mechanical dishwasher.

The fluid pump assembly includes a conduit having a pressurized flow of fluid. A body is provided with a fluid chamber and provided with a passage having an orifice, the passage being connected to the conduit and the fluid chamber. The body also includes a pump cyclinder having an inlet which communicates with a fluid additive supply, and an outlet which communicates with the conduit for feeding the fluid additive to the conduit. Control means include a dump passage communicating with the fluid chamber, the dump passage having an effective cross section larger than that of the orifice. A dump valve means controls fluid flow through the dump passage to regulate the fluid pressure in the fluid chamber. A motor means is operatively connected to the pump means and the dump valve means, and is responsive to the fluid pressure in the fluid chamber for operating the dump valve means and actuating the pump means to pump fluid additive through the outlet.

In one aspect, the motor means includes magnetic means for opening the dump valve means as the motor means is subjected to a first predetermined fluid pressure in the fluid chamber, and for closing the dump valve means as the motor means is subjected to a second predetermined fluid pressure in the fluid chamber. The magnetic means include a permanent magnet and a ferrous plunger which is operatively attached to the dump valve means.

In one aspect of the pump assembly, the motor means includes a flexible motor element subject to fluid pressure in the fluid chamber and a magnet attached to and movable with the flexible motor element. The motor element moves the permanent magnet in a first direction and in an opposite second direction. The permanent magnet tends to urge the ferrour plunger in the first direction to actuate the pump valve means when the permanent magnet is in a first predetermined position relative to the plunger. A resilient means tends to urge the ferrous plunger in the second direction to actuate the pump valve when the permanent magnet is in a second position relative to the plunger.

In one aspect the permanent magnet urges the ferrous plunger in the first direction to open the dump valve means, and the resilient means urges the ferrous plunger in the second direction to close the dump valve means with a snap action when the force of the resilient means overcomes the force of the permanent magnet, when the magnet is in the said second position. The resilient means maintains the dump valve means in a closed position until the magnet is disposed in said first position. The resilient means urges the ferrous plunger in the second direction to close the dump valve means, and a permanent magnet urges the ferrous plunger in the first direction to open the dump valve means with a snap action when the force of the permanent magnet overcomes the force of the resilient means when the magnet is in the said first position. The magnet maintains the dump valve means open until the magnet is disposed in said second position.

In one aspect of the fluid pump assembly, the passage interconnecting the conduit and the fluid chamber and the dump passage include a shared, common portion. In one embodiment, the dump passage includes an entrance to the common passage portion, and the orifice opens to the common passage portion and is aligned with and opposite to the dump passage entrance. In one embodiment, the pump means includes a discharge tube having the outlet the tube extending through the body passage communicating with the conduit with the outlet located in the conduit.

In one aspect of the pump assembly, a priming valve means is operatively connected to the dump passage for selectively controlling flow through the dump passage to regulate the fluid passage in the fluid chamber to actuate the motor means to prime the pump means.

DESCRIPTION OF THE PREFERRED EMBODIMENT

Figure 1:
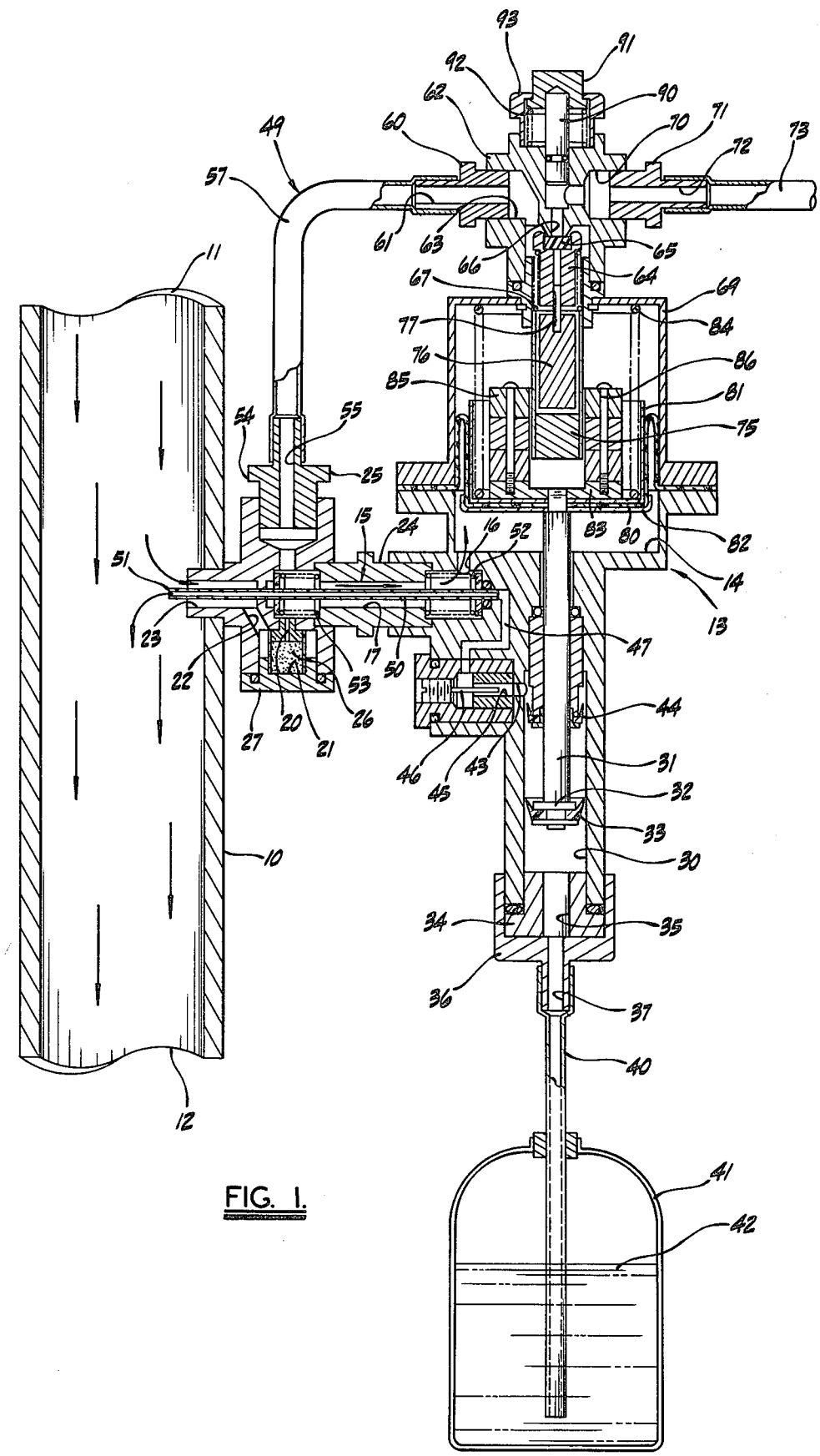
FIG. 1 is a longitudinal section showing the pump assembly during the pumping stroke when the dump valve means is closed.

Referring now by characters of reference to the drawings, the pump assembly includes a conduit 10 having a pressurized flow of fluid. As is conventional, the end 11 of conduit 10 is connected to a water supply (not shown) while end 12 of conduit 10 is connected to a mechanical dishwasher (not shown).

A body generally referred to by 13 includes a fluid chamber 14 and a body passage 15 operatively connecting the conduit 10 and fluid chamber 14. The body passage 15 consists of passages 16 and 17, orifice 20, filter chamber 21 and passages 22 and 23. The body 13 includes a nipple 24, containing passage 17, a fitting 25 containing orifice 20 and filter chamber 21. A filter 26 is located in the chamber 21 and is secured in place by an end plate 27. The passage 22 is contained in fitting 25 and connects filter chamber 21 to passage 23, also within fitting 25. The fitting 25 is attached to conduit 10.

Pump means includes a pump cylinder 30 located within body 13. A piston rod 31 extends into pump cylinder 30. A piston head 32 and piston valve 33 are attached to piston rod 31 in cylinder 30. A cylinder plug 34, with a passage 35, is located on one end of pump cylinder 30, and is mounted in place by a cap 36. The cap 36 includes a pump inlet 37. A supply tube 40 is attached to pump inlet 37.

A reservoir 41 of liquid additive 42, such as a rinse additive to be added into the rinse line or conduit 10 of a mechanical dishwasher, is operatively connected to pump inlet 37 by the supply tube 40.

An outlet passage 43 is located at the opposite end of pump cylinder 30 from inlet 37, and a check valve 44 is located in pump cylinder 30 between inlet 37 and outlet passage 43. A metered orifice 45, with metering controlled by a metering pin 46, communicates with passage 43 and with a discharge tube 50 through passage 47. Discharge tube 50 has an outlet 51 located within conduit 10. The discharge tube 50 passes through passage 17 and is retained in place at one end by retaining spring 52. A retaining spring 53 holds tube 50 within fitting 25. The tube 50 then passes through passage 23 and into conduit 10.

FIG. 1 shows the pump assembly during a pumping stroke. As piston rod 31 moves in a first direction away from inlet 37, liquid additive is drawn from reservoir 41, through supply tube 40, inlet 37, passage 35 and into cylinder 30. Additive fluid between piston head 32 and outlet 43 is forced through check valve 44, outlet 43, metered orifice 45, passage 47, tube 50 and tube outlet 51 into the fluid flow in conduit 10.

Figure 2:
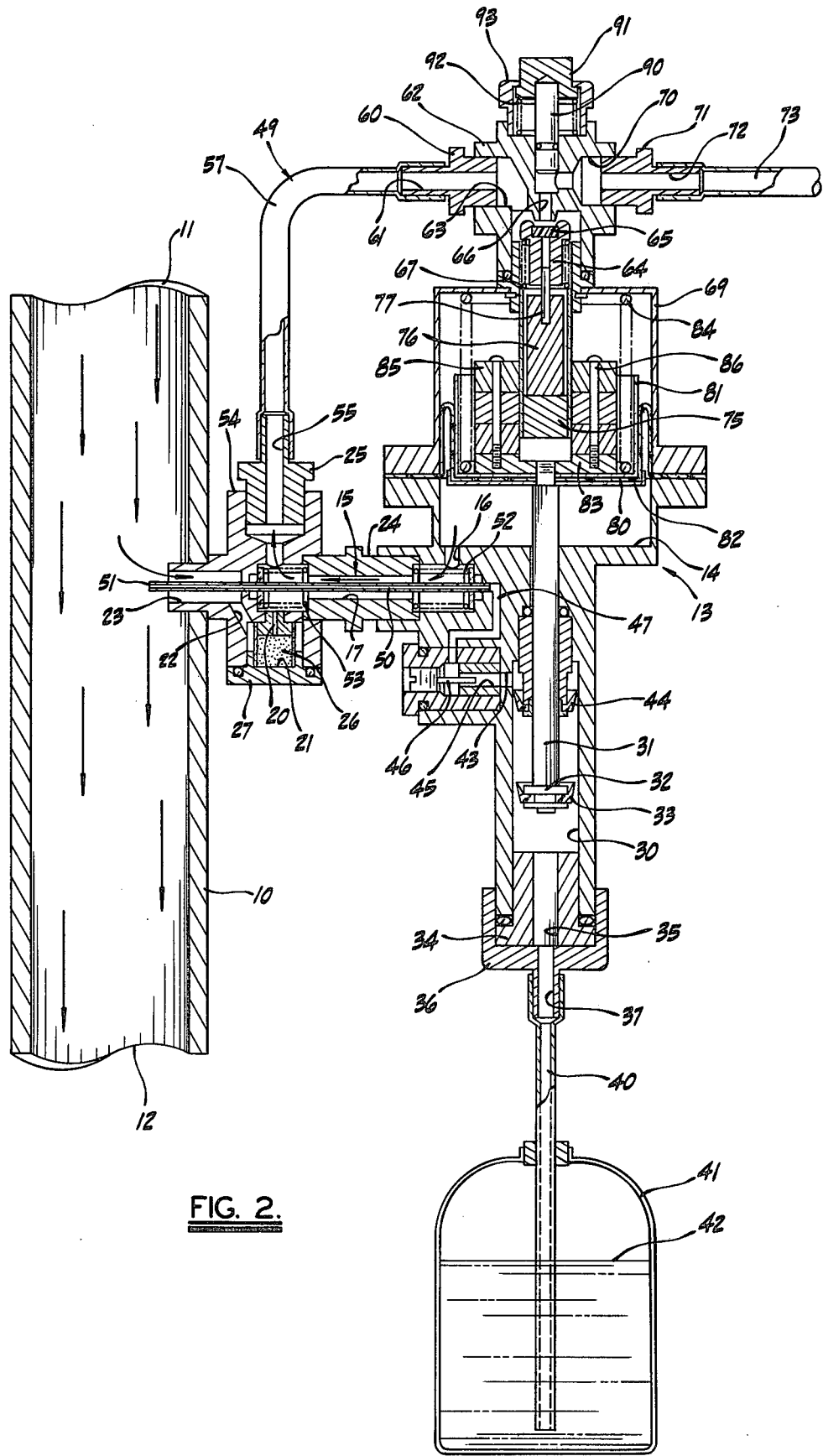
FIG. 2 is a longitudinal cross section of the pump assembly showing the pump in a return stroke when the dump valve means is open.

During a return stroke indicated in FIG. 2, the piston rod 31 moves in the second opposite direction. The check valve 44 closes to prevent fluid from conduit 10 from entering pump cylinder 30. The piston valve 33 opens, permitting fluid in cylinder 30 to pass from the inlet side of piston head 32 to the outlet side of piston head 32.

A control means includes a dump passage indicated generally by 49 communicates with fluid chamber 14 through common shared passages 16 and 17. A fitting 54, with a passage 55, connects to fitting 25. The passage 55 communicates with passage 17 through body passage 56 in fitting 25. The entrance from the shared common passage 17 to the body passage 56 is aligned with and opposite the opening of the orifice 20 to the passage 17. A dump tube 57 is connected to fitting 54 and communicates with a fitting 60, the fitting 60 including a passage 61. The dump passage 49 has an effective cross section larger than the orifice 20 for reasons which will be discussed later.

A valve fitting 62 contains a passage 63. Fitting 60 is attached to valve fitting 62, with passage 61 communicating with passage 63. A valve member 64 and valve seat 65 are contained in fitting 62. A valve port 66 is located in fitting 62, the valve port 66 communicating with passage 63 when valve member 64 and valve seat 65 are in an open position as indicated in FIG. 2. A resilient spring 67, located in fitting 62, tends to hold valve member 64 in a closed position as indicated in FIG. 1.

A passage 70 is contained in fitting 62 and communicates with valve port 66. A fitting 71, with a passage 72, is connected to fitting 62, the passage 72 communicating with passage 70. A drain tube 73 is attached to fitting 71 and provides an outlet for fluid passing through the dump passage, and preferably to a drain (not shown).

Mounted in a body cap 69 is a sleeve 74, the body cap 69 being attached to valve fitting 62. A plug 75 closes one end of sleeve 74. A ferrous plunger 76 is located within sleeve 74. A roll pin 77 is attached at one end to valve member 64 and at the other end to ferrous plunger 76. The relative positions of the plunger 76 and member 64 are determined by the distance to which the pin 77 is extended into each element.

A motor means includes a flexible motor element 80 extends across the chamber 14. A cup 81 is located in body cap 69 on the upper side of element 80. An end plate 82 is located in body cap 69 on the lower side of element 80. A disc 83 is located within cup 81.

The piston rod 31 extends from pump cylinder 30 into fluid chamber 14 and is attached to disc 83 through end plate 82, flexible motor element 80 and cup 81.

Mounted at one end within cup 81 is a spring 84, the other end bearing on the end of body cap 69, the spring 84 surrounding sleeve 74. A magnetic means includes a multiplicity of magnets 85 mounted on disc 83 within spring 84 by bolts 86, the magnets 85 being magnetically coupled to the ferrous plunger 76.

The control means functions as follows: Referring to FIG. 1 which indicates the dump valve member 64 in its closed position, fluid under pressure from conduit 10 enters fluid chamber 14. Th rate of fluid entrance is restricted by orifice 20. Fluid pressure in chamber 14 tends to force the flexible motor element 80 in a first direction, putting spring 84 under compression. Fluid flow continues into fluid chamber 14 until a first predetermined fluid pressure in fluid chamber 14 is reached. The flexible motor element 80 and magnets 85 are then moved in a first position where the magnetic force of magnets 85, acting on ferrous plunger 76, overcomes the resilient force of spring 67 acting on valve member 64. At this first position, plunger 76 snaps in a second opposite direction to a position where the plunger 76 engages plug 75. This movement displaces valve member 64 and valve pad 65 so that passages 63 and 70 communicate with the valve port 66 as indicated in FIG. 2.

Because the effective cross-sectional area of the dump passage 49 is greater than that of orifice 20, fluid from conduit 10 passing through orifice 20 cannot maintain the pressure in fluid chamber 14 under the compression of spring 84. Consequently, the fluid is forced out of chamber 14 and through the dump passage as motor element 80 moves in the second opposite direction. The magnets 85 maintain the valve member 64 in an open position as the flexible motor element 80 moves in the second direction. When a second predetermined fluid pressure in fluid chamber 14 is reached, motor element 80 and magnets 85 reach a second position where the force of spring 67 acting on valve member 64 overcomes the magnetic force of magnets 85 acting on ferrous plunger 76, causing the valve member 64 to close with a snap action and halting the flow of fluid through the dump passage 49. The spring 67 maintains the valve member 64 in its closed position until the flexible motor element 80 again reaches the first position. The apparatus will again be in the condition indicated by FIG. 1.

A priming valve member 90 is located in fitting 62, with one end attached to a button 91. A spring 92 tends to hold priming valve member 90 and button 91 in a first open position. A cap 93 is attached to fitting 62 and holds button 91 and springs 92 in place. When button 91 and priming valve member 90 are depressed, the valve port 66 no longer communicates with passage 70.

When priming the fluid pump, a longer stroke of piston head 32 is required than that provided by the movement of flexible motor element 80 and piston rod 31 from the first position to the second position. When button 91 is depressed, the priming valve member 90 will maintain the dump passage 49 in a closed state even when magnets 85 reach the first position causing the valve member 64 to open. This allows flexible motor element 80 to continue its movement in the first direction until the piston head 32 reaches the limit of its travel in the pump cylinder 30. The button 91 is then released, opening the dump passage 49 and allowing flexible motor element 80 to move in the second direction. The button 91 is depressed on each pumping stroke until the pumping unit has been primed.

It is thought that the structural features and functional advantages of this fluid pump assembly have become fully apparent from the foregoing description of parts but for completeness of disclosure, the operation of the fluid pump assembly will be briefly described.

Referring to FIG. 1, fluid is supplied to the fluid chamber 14, through the orifice 20, when the pressurized flow of fluid is present in the conduit 10. As the volume and fluid pressure present in the fluid chamber 14 increases, flexible motor element 80 is moved in an upward or first direction, compressing spring 84.

The piston rod 31 is operatively attached to the flexible motor element 80, therefore, it also moves in an upward or first direction. The piston head 32 is moved with the piston rod 31. The piston valve 33 is closed, therefore, as it moves in the first direction, fluid additive 42 is drawn from the reservoir 41 into the pump cylinder 30 below the piston head 32. The fluid additive located in pump cylinder 30 above piston head 32 is forced through check valve 44, metered orifice 45 and tube 50, and into the fluid flow in the conduit 10 at the outlet 51.

When the flexible motor element 80 reaches a first position, magnets 85 magnetically open the valve port 66 through their movement of the ferrous plunger 76 with a snap action as indicated in FIG. 2. The fluid under pressure in the fluid chamber 14 can then flow out of the fluid chamber 14 through the dump passage 49. The cross-sectional area of dump passage 49 is larger than that of the orifice 20, therefore, fluid leaves the fluid chamber 14 at a faster rate than it can be supplied through the orifice 20.

The spring 84 causes flexible motor element 80 to move in a downward second direction as magnets 85 tend to hold the ferrous plunger 76 and valve member 64 in their open position. As the flexible motor element 80 moves in the second direction, piston rod 31 also moves in the downward second direction. The piston valve 33 opens, allowing fluid additive in pump cylinder 30 to pass from the lower side to the upper side of piston head 32. The check valve 44 closes preventing the pressurized fluid within conduit 10 from entering pump cylinder 30.

When a second position is reached by flexible motor element 80, the spring 67 acting on valve member 64 overcomes the magnetic force acting on the ferrous plunger 76, and the valve member 64 closes with a snap action. The valve port 66 is then maintained closed by the valve member 64 under the action of the spring 67, and fluid pressure within fluid chamber 14 increases. The cycle of operation is then repeated.

I claim as my invention:

1. In a fluid pump assembly:
   (a) a conduit having a pressurized flow of fluid,
   (b) a body provided with a fluid chamber, and provided with a passage having an orifice connected to the conduit and the fluid chamber,
   (c) pump means including an outlet and a piston rod,
   (d) a fluid additive supply connected to the pump means,
   (e) control means including:
      1. a dump passage communicating with the fluid chamber, the dump passage having an effective cross section larger than the orifice,
      2. a dump valve means for controlling flow through the dump passage to regulate the fluid pressure in the fluid chamber, and
      3. motor means in the fluid chamber operatively connected to the pump means by the piston rod and to the dump valve means, and responsive to the fluid pressure in the fluid chamber, for operating the dump valve means and actuating the pump means to pump fluid additive through the outlet,
   (f) the outlet of the pump means communicating with the conduit for feeding the fluid additive to the conduit,
   (g) the motor means including:
      1. magnetic means operatively connected to the dump valve means for opening the dump valve means as the motor means is subjected to a first predetermined fluid pressure in the fluid chamber, and for closing the dump valve means as the motor means is subjected to a second predetermined fluid pressure in the fluid chamber,
   (h) the magnetic means including:
      1. a permanent magnet carried by the motor means, and
      2. a ferrous plunger attached to the dump valve means and actuated by the permanent magnet for operating the dump valve means.

2. In a fluid pump assembly:
   (a) a conduit having a pressurized flow of fluid,
   (b) a body provided with a fluid chamber, and provided with a passage having an orifice connected to the conduit and the fluid chamber,
   (c) pump means including an outlet and a piston rod,
   (d) a fluid additive supply connected to the pump means,
   (e) control means including:
      1. a dump passage communicating with the fluid chamber, the dump passage having an effective cross section larger than the orifice,
      2. a dump valve means for controlling flow through the dump passage to regulate the fluid pressure in the fluid chamber,
      3. motor means in the fluid chamber operatively connected to the pump means, by the piston rod and to the dump valve means, and responsive to the fluid pressure in the fluid chamber, for operating the dump valve means and actuating the pump means to pump fluid additive through the outlet, and
      4. valve actuating means operatively interconnecting the motor means and the dump valve means for operating the dump valve means,
   (f) the outlet of the pump means communicating with the conduit for feeding the fluid additive to the conduit, and
   (g) a priming valve means operatively connected to the dump passage for selectively controlling the flow through the dump passage independently of the dump valve means to regulate the fluid pressure in the fluid chamber to actuate the motor means to prime the pump means.

3. In a fluid pump assembly:
   (a) a conduit having a pressurized flow of fluid, (b) a body provided with a fluid chamber, and provided with a passage having an orifice connected to the conduit and the fluid chamber,
(c) pump means including an outlet,
(d) a fluid additive supply connected to the pump means,
(e) control means including:
1. a dump passage communicating with the fluid chamber, the dump passage having an effective cross section larger than the orifice,
2. a dump valve means for controlling flow through the dump passage to regulate the fluid pressure in the fluid chamber, and
3. motor means operatively connected to the pump means and the dump valve means, and responsive to the fluid pressure in the fluid chamber, for operating the dump valve means and actuating the pump means to pump fluid additive through the outlet,
(f) the outlet of the pump means communicating with the conduit for feeding the fluid additive to the conduit,
(g) the motor means including:
1. a flexible motor element located in the fluid chamber and subjected on one side to fluid pressure in the fluid chamber,
2. a first resilient means acting on the opposite side of the flexible motor element and opposing the fluid pressure in the fluid chamber,
3. a permanent magnet operatively connected to and movable with the flexible motor element, the magnet being located on the said opposite side of the motor element, and
4. a ferrous plunger magnetically coupled to the permanent magnet,
(h) the dump valve means is operatively connected to the ferrous plunger,
(i) the control means including a second resilient means operatively connected to the ferrous plunger, the permanent magnet opening the dump valve means with a snap action when the force of the magnet overcomes the force of the second resilient means when the magnet is disposed in a first position relative to the plunger, and the resilient means closing the dump valve means with a snap action when the force of the second resilient means overcomes the force of the magnet when the magnet is disposed in a second position relative to the plunger, the magnet maintaining the dump valve means open until the magnet is disposed in said second position, and the resilient means maintaining the dump valve means closed until the magnet is disposed in said first position,
(j) the magnet is moved to the said first position by the flexible motor element upon an increase in fluid pressure in the fluid chamber when the dump valve means closes the dump passage, and is moved to the said second position by the flexible motor element upon a decrease in fluid pressure in the fluid chamber when the dump valve means opens the dump passage, and
(k) the pump including a piston rod operatively connected to and extending from said one side of the flexible motor element.

4. In a fluid pump assembly:
(a) a conduit having a pressurized flow of liquid,
(b) a body provided with a fluid chamber, and provided with a passage having an orifice connected to the conduit, and the fluid chamber,
(c) pump means including an outlet and a piston rod,
(d) a fluid additive supply connected to the pump means,
(e) control means including:
1. a dump passage communicating with the fluid chamber, the dump passage having an effective cross section larger than the orifice,
2. a dump valve means for controlling flow through the dump passage to regulate the fluid pressure in the fluid chamber, and
3. motor means operatively connected to the pump means by the piston rod and to the dump valve means, and responsive to the fluid pressure in the fluid chamber, for operating the dump valve means and actuating the pump means to pump fluid additive through the outlet,
(f) the outlet of the pump means communicating with the conduit for feeding the fluid additive to the conduit,
(g) the motor means including:
1. magnetic means operatively connected to the dump valve means for opening the dump valve means as the motor means is subjected to a first predetermined fluid pressure in the fluid chamber, and for closing the dump valve means as the motor means is subjected to a second predetermined fluid pressure in the fluid chamber, and
(h) the motor means including:
1. a flexible motor element located in the fluid chamber and subjected on one side to fluid pressure in the fluid chamber, and
2. The magnetic means comprising a permanent magnet attached to and movable with the flexible motor element, and a ferrous plunger operatively attached to the dump valve means and actuated by the permanent magnet for operating the dump valve means.

5. A fluid pump assembly as defined in claim 4, in which:
(i) the flexible motor element moves the permanent magnet in a first direction and in an opposite second direction,
(j) the permanent magnet tends to urge the ferrous plunger in the first direction to actuate the dump valve means when the permanent magnet is in a first predetermined position relative to the plunger, and
(k) the control means includes a resilient means tending to urge the ferrous plunger in the second direction to actuate the dump valve means when the permanent magnet is in a second position relative to the plunger.

6. A fluid pump assembly as defined in claim 5, in which:
(l) the permanent magnet urges the ferrous plunger in the first direction to open the dump valve means, and
(m) the resilient means urges the ferrous plunger in the second direction to close the dump valve means with a snap action when the force of the resilient means overcomes the force of the permanent magnet when the magnet is in the said second position, the resilient means maintaining the dump valve means closed until the magnet is disposed in said first position.

7. A fluid pump assembly as defined in claim 5, in which:
- (l) the resilient means urges the ferrous plunger in the second direction to close the dump valve means, and
- (m) the permanent magnet urges the ferrous plunger in the first direction to open the dump valve means with a snap action when the force of the permanent magnet overcomes the force of the resilient means when the magnet is in the said first position, the magnet maintaining the dump valve means open until the magnet is disposed in said second position.

* * * * *